United States Patent

[11] 3,629,061

| [72] | Inventors | Richard C. Noyes<br>Hartford;<br>Mena G. Andrews, Newington, both of Conn. |
|---|---|---|
| [21] | Appl. No. | 824,926 |
| [22] | Filed | May 15, 1969 |
| [45] | Patented | Dec. 21, 1971 |
| [73] | Assignee | The United States of America as represented by the United States Atomic Energy Commission |

[54] FUEL SUBASSEMBLY FOR NUCLEAR REACTOR
3 Claims, 2 Drawing Figs.

[52] U.S. Cl. .................................................. 176/78, 176/71, 176/92
[51] Int. Cl. .................................................. G21c 3/32, G21c 5/14
[50] Field of Search .................................. 176/78, 76, 92, 71, 84

[56] References Cited

UNITED STATES PATENTS

| 3,189,524 | 5/1965 | Hocker et al. ................ | 176/71 |
| 3,197,389 | 7/1965 | Dudek et al. ................ | 176/71 X |
| 3,350,274 | 10/1967 | Higatsberger ................ | 176/71 X |
| 3,029,198 | 4/1962 | Anderson et al. ............. | 176/78 X |
| 3,280,003 | 10/1966 | Alfillie et al. ................. | 176/78 X |
| 3,413,196 | 11/1968 | Fortesque et al. ............ | 176/78 X |
| 3,071,526 | 1/1963 | Litt................................. | 204/154.2 |

FOREIGN PATENTS

| 1,187,332 | 9/1960 | Germany..................... | 176/71 |

Primary Examiner—Benjamin R. Padgett
Assistant Examiner—Gary G. Solyst
Attorney—Roland A. Anderson

ABSTRACT: A nuclear fuel subassembly comprising a shroud for enclosing fuel, the walls of the shroud containing spaces for carrying neutron moderating material. A honeycomb for lending structural rigidity is sandwiched in the walls of the shroud, the spaces in the honeycomb containing the neutron moderating material.

PATENTED DEC21 1971 3,629,061

INVENTORS.
RICHARD C. NOYES
BY MENA G. ANDREWS

FUEL SUBASSEMBLY FOR NUCLEAR REACTOR

BACKGROUND OF THE INVENTION

The invention described herein was made in the course of, or under a contract with the U.S. Atomic Energy Commission.

In the design of a fast spectrum nuclear reactor it is essential for reasons of safety that a substantial negative Doppler effect be present, that is, reactivity should tend to decline with increases in power to prevent a runaway situation from developing.

One of the ways by which this can be accomplished is by the addition of a moderating material such as beryllium oxide to the core of the reactor. Conventionally, this involves in a typical construction of replacing some of the fuel pins, that is a portion of the fuel, with moderator pins or the like.

The conventional accomplishment of this purpose described above has the disadvantages of affecting adversely the plutonium breeding efficiency of the reactor, the fuel cycle costs of the system and of reducing the space available for fuel in the core.

SUMMARY OF THE INVENTION

The present invention avoids the disadvantages and difficulties involved in conventional ways of obtaining a substantial negative Doppler effect in a fast spectrum nuclear reactor by substituting the moderator material for some of the structural portion of the fuel elements, avoiding the substitution of moderator for fuel.

In accordance with this invention, in a preferred embodiment, the solid hexagonal subassembly shroud is replaced with a honeycomb with the voids or spaces in the structure filled with moderator. In other words, the moderator material replaces steel rather than fuel.

As a result of this construction, a substantial reduction in the amount of structural material (steel) required in the core is obtained. This in turn makes space available for moderating material thus avoiding the necessity to remove fuel to make this space available. As compared to the conventional solution, this construction results in more fuel and less structural material in the core region. This relative improvement in fuel and steel fraction improves the neutron economy of the system thus improving plutonium breeding and fuel cycle costs. Placement of the refractory moderator in the shroud wall also improves the capability of the shroud to resist attack by molten fuel in the event of an accident.

It is thus a principal object of this invention to provide a fuel subassembly for a nuclear reactor with more effective and efficient provision for obtaining a substantial negative Doppler effect.

Other objects and advantages of this invention will hereinafter become obvious from the following description of a preferred embodiment of this invention.

DESCRIPTION OF THE PREFERRED EMBODIMENT

Figure 1:
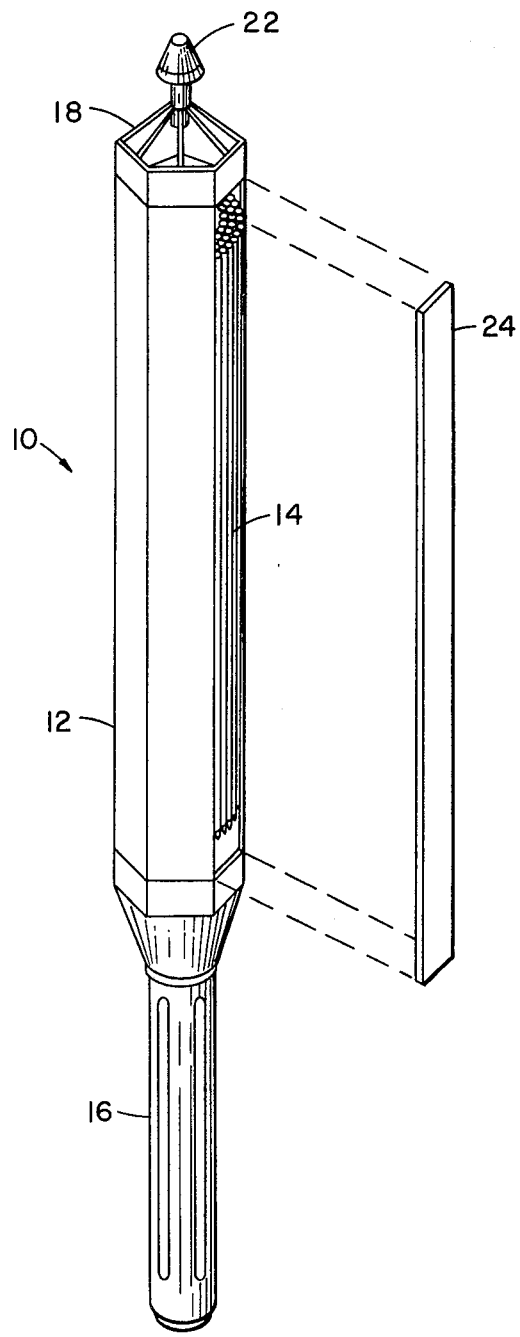
FIG. 1 is an isometric view with a blown-up portion of a preferred embodiment.

Referring to the drawing, fuel subassembly 10 consists of a hexagonal shroud 12 in which are mounted a plurality of extended fuel pins 14 supported at the upper and lower ends by plates or grids not shown. The lower end of fuel subassembly 10 has a fitting 16 for admitting coolant and at the upper end is a support assembly 18 with grappling member 22.

Figure 2:
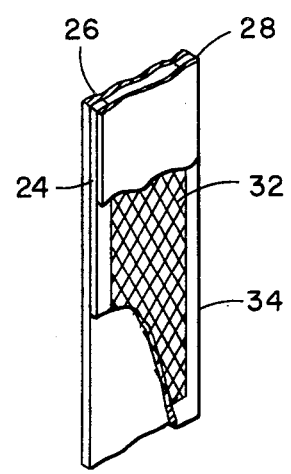
FIG. 2 is a detail of a portion of the shroud shown in FIG. 1.

Shroud 12 is made up of a plurality of shroud panels such as panel 24 shown removed, and as illustrated in FIG. 2, each panel 24 is constructed of inner and outer walls 26 and 28 sandwiching therebetween a honeycomb 32 surrounded by a frame 34 as the inner layer.

Honeycomb 32 consists of a strong metal matrix containing in the spaces or voids a second material of suitable neutron moderating characteristics such as beryllium oxide. In this way shroud 12 is provided with adequate structural rigidity while at the same time providing space for moderating material without detracting from space needed for fuel within the core. It should be mentioned that instead of a honeycomb of the type mentioned a cermet consisting for example of stainless steel and beryllium oxide may be used to fill the space between walls 26 and 28 inside of frame 32. Also, materials other than moderating materials such as for example boron carbide (a burnable poison) may be used.

The following table compares a conventional hexagonal subassembly with solid shroud and 19 moderator pins occupying fuel pin spaces with that of a honeycomb shroud of the type herein described as the preferred embodiment with all the moderator within the shroud panels.

TABLE (Comparison of alternate moderator arrangements)

| Arrangement | Hexagonal subassembly with solid shroud and 19 moderator pins | Honeycomb shroud with moderator in shroud |
|---|---|---|
| Volume fractions: | | |
| Fuel | 0.355 | 0.400 |
| Sodium | 0.407 | 0.407 |
| Steel | 0.189 | 0.138 |
| BeO moderator (% density) | 0.049 (77) | 0.055 (60) |
| Voided doppler (T dk/dt) | −0.004 | −0.004 |
| Fuel cycle cost changes * (mills/kwh) | +0.15 | +0.04 |
| Doubling time change * (years) | +1.4 | +0.4 |

*Compared to unmoderated core.

It is thus seen that there has been provided an improved fuel subassembly arrangement for a fast spectrum nuclear reactor capable of producing a substantial negative Doppler effect in the reactor.

While only a preferred embodiment has been described and illustrated it is understood that many variations of this invention thereof are possible as defined in the following claims.

We claim:

1. A nuclear fuel subassembly comprising:
   a. a plurality of extended fuel elements;
   b. shroud means extending over the whole length of, and enclosing said fuel elements; and
   c. means at opposite ends of said subassembly for permitting coolant to flow through said shroud means;
   d. said shroud means consisting of spaced inner and outer walls surrounding said fuel elements, the spaces between said inner and outer walls being filled with structural material containing voids, said voids filled with refractory neutron moderating material.

2. The nuclear fuel subassembly of claim 1 in which said structural material containing voids is a honeycomb, said inner and outer walls with said honeycomb forming a sandwich construction.

3. The nuclear fuel subassembly of claim 2 in which said shroud means is divided into panels, each of said panels consisting of said sandwich construction of inner and outer walls and said honeycomb therebetween, said honeycomb being surrounded by a frame along the outer edge of each said panel, thereby fully enclosing the moderating material within each said panel.

* * * * *